United States Patent
Sguotti et al.

(10) Patent No.: US 9,841,058 B2
(45) Date of Patent: Dec. 12, 2017

(54) ASSEMBLY PROCEDURE OF A BEARING UNIT—HUB FLANGE

(71) Applicants: Laura Sguotti, Pinerolo (IT); Gabriele Bonifetto, Vigone (IT); Flavio Franza, San Secondo di Pinerolo (IT); Luca Tedeschini, Airasca (IT)

(72) Inventors: Laura Sguotti, Pinerolo (IT); Gabriele Bonifetto, Vigone (IT); Flavio Franza, San Secondo di Pinerolo (IT); Luca Tedeschini, Airasca (IT)

(73) Assignee: AKTIEBOLAGET SKF, Gothenburg (SE)

( * ) Notice: Subject to any disclaimer, the term of this patent is extended or adjusted under 35 U.S.C. 154(b) by 9 days.

(21) Appl. No.: 15/138,930

(22) Filed: Apr. 26, 2016

(65) Prior Publication Data

US 2016/0319875 A1    Nov. 3, 2016

(30) Foreign Application Priority Data

Apr. 29, 2015    (IT) .................... 102015000013549

(51) Int. Cl.
*F16C 43/06*    (2006.01)
*F16C 19/18*    (2006.01)
(Continued)

(52) U.S. Cl.
CPC ............ *F16C 43/065* (2013.01); *F16C 19/18* (2013.01); *F16C 19/185* (2013.01); *F16C 33/76* (2013.01);
(Continued)

(58) Field of Classification Search
CPC ....... F16C 19/18; F16C 19/185; F16C 33/416; F16C 43/04; F16C 43/045; F16C 43/06;
(Continued)

(56) References Cited

U.S. PATENT DOCUMENTS 1,146,271 A * 7/1915 Mossig et al. .......... F16C 33/40
                                                        384/511
3,532,401 A    10/1970 McKee
(Continued)

FOREIGN PATENT DOCUMENTS

| EP | 2602123 A1 | 6/2013 |
| FR | 2888625 A1 | 1/2007 |
| JP | 2007224941 A | 9/2007 |

*Primary Examiner* — Phillip A Johnson
(74) *Attorney, Agent, or Firm* — Bryan Peckjian; SKF USA Inc. Patent Dept.

(57) ABSTRACT

A procedure for mounting a hub bearing assembly including a rotatable hub, and a bearing unit having a stationary radially outer ring, and two rolling bodies disposed between the radially outer ring and the hub, and executing the steps of hammering a first seal on the hub, mounting a cage on the seal seat, providing the outer ring assembly in axially offset manner relative to the hub, mounting the rolling bodies axially externally from the axially inner side, combining the hub to the outer ring, positioning the outer ring inclination at a predetermined angle, mounting the rolling bodies from the axially inner side, aligning the hub to the radially outer ring, snap insertion of the cage, on rolling bodies from the axially outer side and the cage, on rolling bodies from the axially inner side, hammering a second seal on its seat, from the axially inner side.

6 Claims, 5 Drawing Sheets

(51) Int. Cl.
  *F16C 33/76* (2006.01)
  *F16C 43/04* (2006.01)
  *F16C 33/41* (2006.01)

(52) U.S. Cl.
  CPC ............ *F16C 43/06* (2013.01); *F16C 33/416* (2013.01); *F16C 43/045* (2013.01); *F16C 2226/12* (2013.01); *F16C 2226/74* (2013.01); *F16C 2326/02* (2013.01)

(58) Field of Classification Search
  CPC   F16C 43/065; F16C 2226/12; F16C 2226/74; F16C 2326/02
  See application file for complete search history.

(56) References Cited

U.S. PATENT DOCUMENTS

| | | | |
|---|---|---|---|
| 4,411,479 A | | 10/1983 | Hirata et al. |
| 5,491,893 A | * | 2/1996 | Hurrell, II .......... B60B 27/0005 29/898.061 |
| 2002/0176640 A1 | | 9/2002 | Yano |

* cited by examiner

ASSEMBLY PROCEDURE OF A BEARING UNIT—HUB FLANGE

CROSS-REFERENCE TO RELATED APPLICATIONS

This application claims priority to Italian patent application no. 102015000013549 filed on Apr. 29, 2015, the contents of which are fully incorporated herein by reference.

TECHNICAL FIELD OF THE INVENTION

The present invention relates to a procedure for mounting of a bearing group—flanged hub that is the so-called third generation rolling bearing. The group in question is suitable for applications where the outer ring of the bearing is stationary, or for applications at a driving wheel of a motor vehicle.

TECHNICAL BACKGROUND

The document EP 2602123 A1, for example, describes a hub bearing unit, in this case asymmetrical, for the wheel of a motor vehicle, which includes a flanged hub rotatable around a rotation axis, a flange integral with the hub flanged and transverse to the axis of rotation, a stationary ring disposed radially outside of the flanged hub and provided with rolling tracks axially spaced from one another, and two rolling bodies crowns (for example, balls) arranged between the stationary ring and the flanged hub. The flanged hub integrally form a radially inner raceway for the ball bearing axially outer, while the radially inner raceway for the balls axially inner crown is formed on an inner ring of the bearing, radially outer planted on flanged hub.

Such a realization, especially in the case of heavy duty applications in terms of load transmitted, entails considerable local loads between the bearing rings and rolling bodies; also does not permit to obtain large values of resistance of the bearing and its greater duration in the time. Finally, usually it presents important axial dimensions, due to the presence of a flange integral to the flange portion and the hub transverse to the axis of rotation.

To increase the performance and especially the stiffness of the bearing is required to increase the distance of the pressure centers. This can be achieved by increasing the diameter of the circumference of the centers of the rolling bodies (the so-called "pitch diameter" or more simply "pitch") of the bearing. Such solutions are already known and are developed in order to significantly improve the performance. The disadvantage connected to the increase of the "pitch" is that consequently also the volume and therefore weight dramatically increase with the "pitch-squared value". This increase in weight can usually not be accepted by car manufacturers.

A further improvement is to increase even more the diameter of the circumference of the centers of the rolling bodies so as to be able to enter inside the bearing constant velocity joint and integrate in a single piece the so-called bell of the joint with the hub, or with the inner ring of the bearing. Evidently, the integration of both components allows the reduction of weight and cost of the entire unit. And possible to further reduce weight and costs by integrating also the small inner ring of the bearing, the axially internal, with the bell of the joint. In other words, the hub also assumes the function of single inner ring of the bearing and the bell of the joint at a constant speed.

The concept of single inner ring is already known in so-called third-generation bearings. The development of this feature foresaw the use of a single cage for both rolling bodies of the two tracks to be mounted at the axially inner side. This feature, the single cage, however, is not acceptable in current projects of bearing units that require more and more high performance. In fact, the single cage can create several problems. During the operational conditions of the bearing often it happens that the contact angles of the two tracks with the corresponding rolling bodies (for example, spheres) may slightly differ relative to one another. Consequently, they also change the points of contact between tracks and balls and therefore also the diameters of the circumference of the same sphere centers ("pitch"). On an equal angular speed of the wheel, the linear velocity varies proportionally to the "pitch change". In other words, the two rows of balls have different speed. The cage, which performs the function of keeping the distance between the rolling bodies, however, cannot be subjected to significant forces and as typical consequence, if it is exposed overloads, disintegrates or melts.

It is up to now analyse the case of the so-called symmetrical bearing, that is with the same "pitch" for both crowns of rolling bodies. The drawbacks outlined above, is obviously also present in the case of asymmetric bearings.

Therefore, the existing high-performance solutions, which adopt a single inner ring, require a new mounting procedure, compared to the up to now used for standard applications.

SUMMARY OF THE INVENTION

The object of the present invention is to provide a procedure for mounting of a hub bearing unit for application of the driving wheel of a motor vehicle, which is free from the drawbacks described above. The assembly process can be realized both in the case of bearings with symmetrical internal form, or with the same "pitch" for the two crowns of rolling bodies, both in the case of asymmetric bearings, or with different "pitch" between the two crowns of rolling bodies.

According to the present invention there is described a procedure for mounting of a hub bearing assembly, having the characteristics set out in the appended independent claim.

Additional embodiments of the invention, preferred and/or particularly advantageous, are described according to the characteristics set forth in the appended dependent claims.

BRIEF DESCRIPTION OF DRAWINGS

The invention will now be described with reference to the accompanying drawings, which illustrate some examples of non-limiting embodiments, in which.

DETAILED DESCRIPTION OF THE INVENTION

Figure 1:
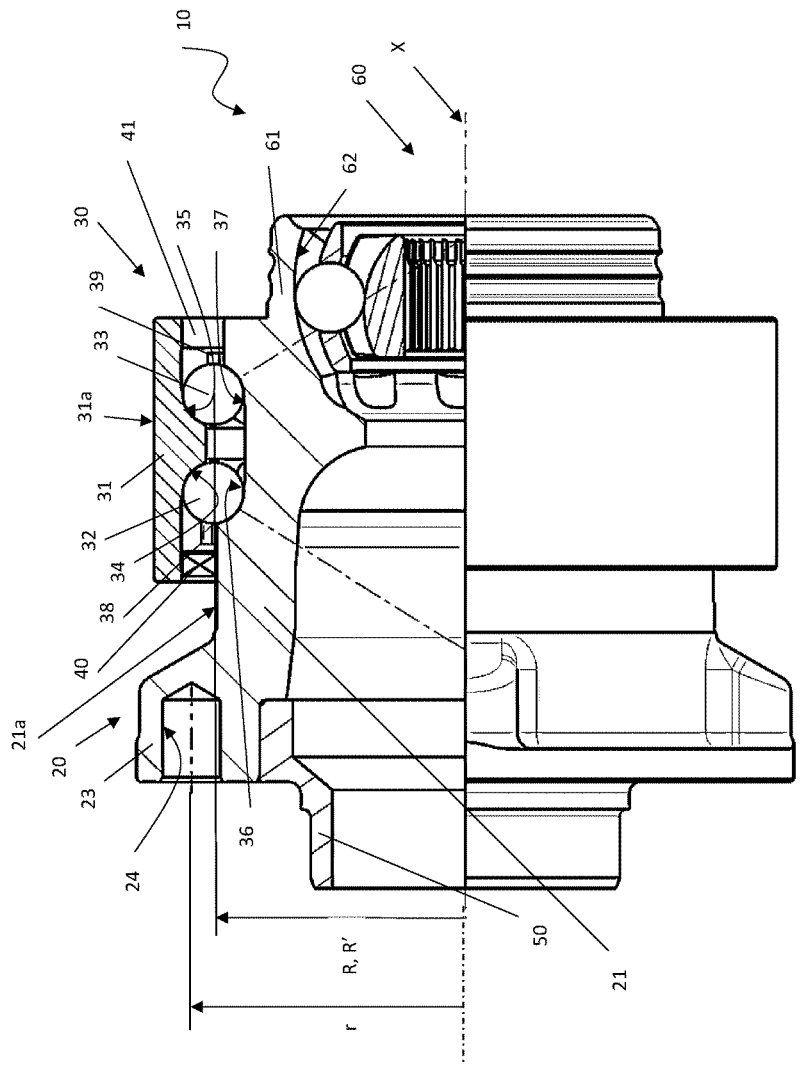
FIG. 1 is an axisymmetric sectional view of a bearing assembly—of symmetric inner shape hub, mounted according to the process of the present invention.

Referring now to FIG. 1, a hub-bearing assembly according to a preferred embodiment of the invention is indicated as a whole with 10.

The assembly 10 includes a rotatable hub 20 and a bearing unit 30. The hub 20, as will be seen better hereinafter, is configured to also take the inner rolling loop function of the bearing bell and a joint of constant speed drive. Throughout the present description and in the claims, terms and expressions indicating positions and orientations such as "radial" and "axial" refer to the axis X of the central bearing rotation unit 30. Expressions such as "axially outer" and "axially inner" are, however, referred to the mounted condition, and in this case, preferably, refer to a wheel side and, respectively, to a side opposite to the wheel side.

The bearing unit 30 provides a radially outer ring 31, stationary and two crowns of rolling bodies 32, 33, in this example balls, interposed between the radially outer ring 31 and the hub 20 with radially inner ring function. For simplicity of graphic representation references 32 and 33 will be attributed both to individual spheres, both to the crown of spheres and in particular with 32 will indicate the ring of balls or the single axially outer sphere, while with 33 will indicate the ring of balls or the single axially inner sphere. Again for simplicity, we often use the term "sphere" used by way of example in the present description and in the accompanying drawings instead of the more generic term "rolling body" (and will also be using the same numerical references). It will be understood always that in place of the spheres it may be used any other rolling I cover (for example, rollers, tapered rollers, needles, etc.).

Figure 2:
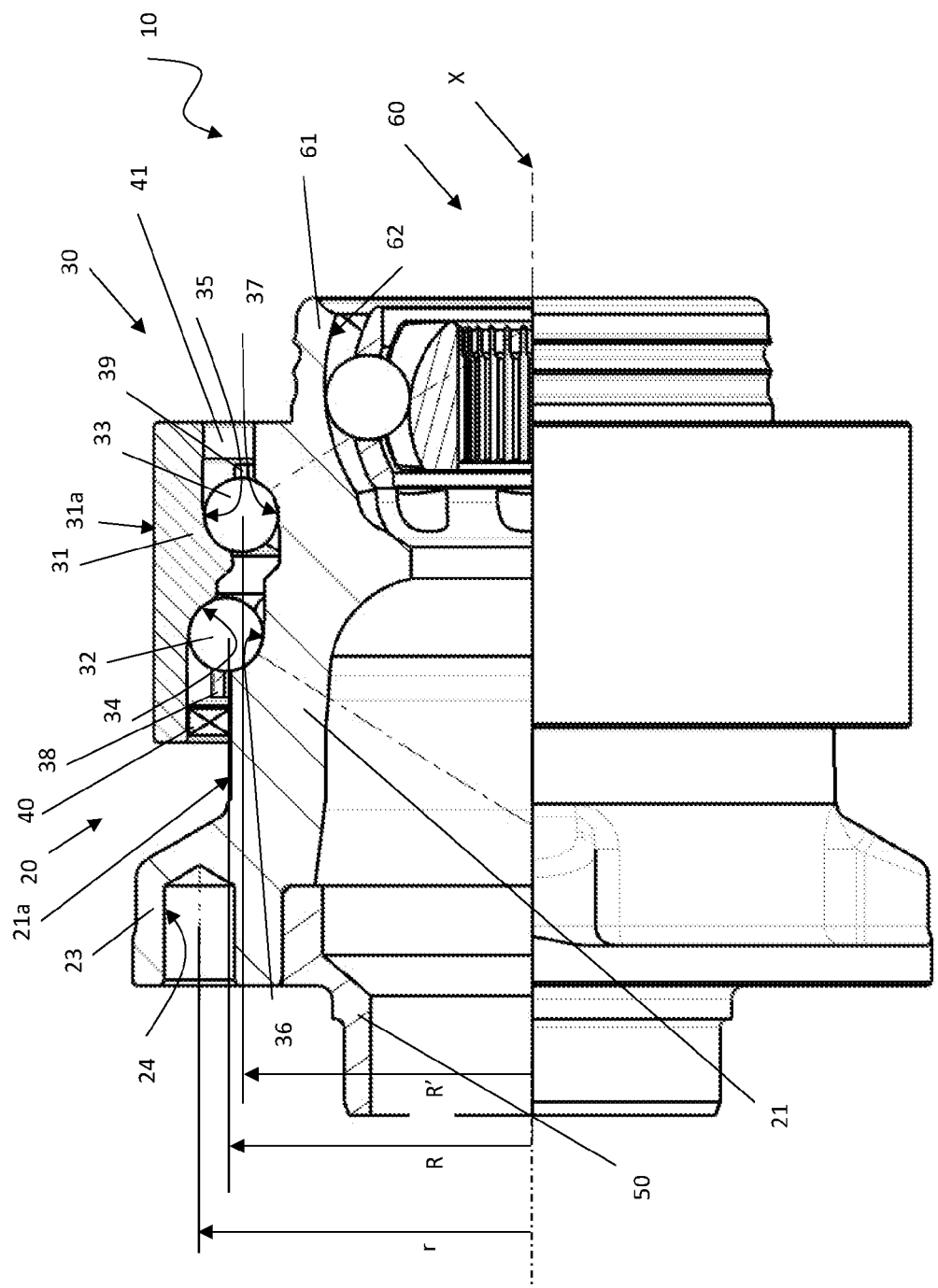
FIG. 2 is an axisymmetric sectional view of a bearing assembly—of asymmetric form internal hub, mounted according to the same procedure.

In FIG. 1 is shown the case of a symmetrical bearing, i.e. with the same "pitch" for both crowns of rolling bodies. What will be said in the following description is also applicable to the case of the asymmetrical bearing, shown in FIG. 2, where for simplicity we have used the same references. As can be seen the only substantial difference between the two types of bearing is that, while in the case of symmetrical bearing the radii R, R' of the circumferences of the centers of the rolling bodies of the corresponding crowns 32, 33 assume the same value, in case of asymmetrical bearing the same rays differ between them. In the example in FIG. 2, in particular, the radius R of the circle of the centers of the rolling bodies of the crown 32, axially outer, is greater than the radius R' of the circumference of the crown of the rolling bodies of the centers 33, axially inner.

The radially outer ring 31, preferably shaped in tubular form axially extended, defines internally the raceways 34, 35 to the corresponding rolling bodies of the crowns 32, 33.

The radially outer ring 31 has a radially outer cylindrical surface 31a adapted to mate with a cylindrical seat formed in a fixed member of the vehicle, such as a pillar of a suspension, of a known type and not shown in figure. The cylindrical surface 31a extends for the entire axial dimension of the radially outer ring 31 and has an axial dimension of the order of magnitude of that of the cylindrical seat of the upright.

The rolling bodies of the crowns 32, 33 rotate, as well as on the ring radially outer 31, on a central tubular portion 21 of the hub 20 which defines a rolling track 36 for the rolling bodies of the axially outer crown 32 and a track of 37 for the rolling of rolling bodies of the crown 33, the axially inner. The crowns 32, rolling bodies 33 are kept in position by corresponding cages 38, 39, namely a first cage 38, axially outer, for the rolling bodies 32 and a second cage 39, axially inner, for the rolling bodies 33. a first sealing means 40 seals the bearing unit from the axially outer side, being planted on a cylindrical surface 21a, a radially outer, of the tubular portion 21 of the hub 20 and a second sealing means 41 seals the bearing unit from the axially side internal.

The hub 20 also defines a flange portion 23 axially outer. The flange portion has a plurality of axial fixing holes 24, the axes of which are arranged along a circumference of radius r, with respect to the axis of symmetry X. These holes are the seats for the same number of fixing means (such as captive bolts, not shown in the figure) that connect in a known manner an element of the motor vehicle wheel, for example the brake disc (also of known type and not shown in the figure), to the hub 20.

Advantageously, a bushing 50 for centering the wheel of the motor vehicle can be realized by means of a metal sheet, for example of steel, and coupled to the flange portion 23 of the hub, preferably by means of a simple hammering operation.

The bearing unit 30 is made so as to obtain the radii R, R' of the circumferences of the centers of the rolling bodies of the corresponding crowns 32, 33 slightly lower than or substantially equal to the radius r of the circumference of the fixing axes of the holes 24. This substantial geometrical equality, in the case of asymmetrical bearing, will be verified at least with the radius R of the circle of the centers of the rolling bodies 32, axially external, i.e. closest to the wheel of the motor vehicle brake disc. By means of this solution, the flanged hub assumes a conformation in the manner of a rotor, i.e. its flange portion is very reduced. The above solution is obtained by increasing the radius R, R' of the circumferences of the centers of the rolling bodies and of course, leaving unaltered, since the case of a constraint of the motor design, the radius r of the circumference of the fixing axes of the holes 24.

The transmission of the motion from a drive shaft of a motor vehicle transmission assembly (not shown) is guaranteed by a constant velocity joint 60. In particular, the outer bell of the coupling 60 is integrated in the hub 20 which in its axially inner terminal part 61 He defines the track 62 of the joint.

The procedure for mounting the bearing assembly—the hub of FIG. 1 is illustrated with reference to FIGS. 3 to 5, referring to the type of symmetrical bearing. In the case of asymmetrical bearing as will be apparent from its description, the assembly process can be applied in exactly the same way.

Figure 3:
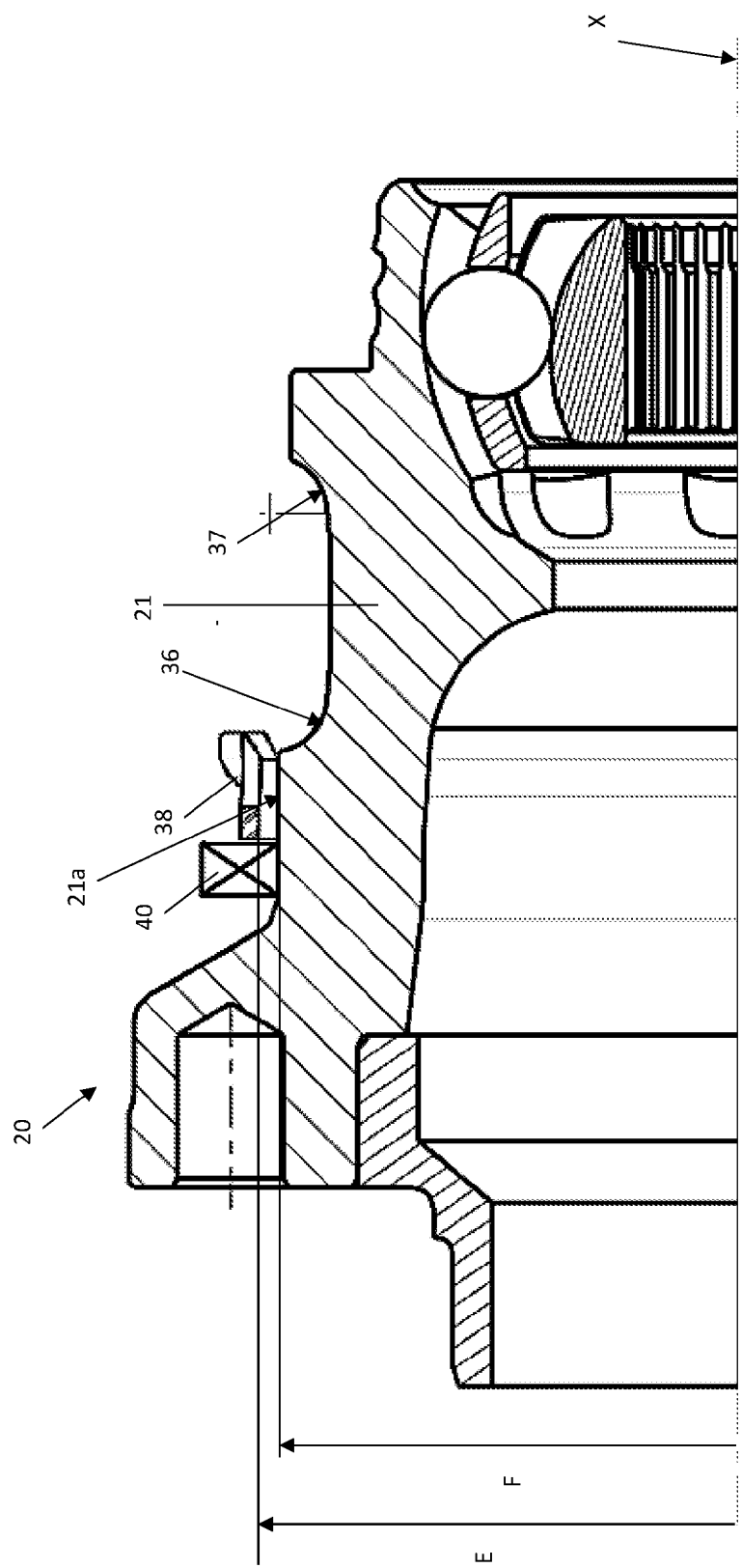
FIG. 3 shows a first stage of the bearing assembly mounting procedure—hub.

In more detail, in FIG. 3 it can be observed that, starting from the hub with availability of inner ring function, the first sealing means 40 is planted on the rotatable hub 20, in particular on the cylindrical surface 21a of the central tubular portion 21. Subsequently, mounts, always from the end of the axially inner hub, the cage 38 axially outside. Note that the cage is mounted temporarily not in its final position, i.e. in correspondence of the axially outer track 36: in this phase of the assembly, the axially outer cage 38 must be positioned on the diameter F of the cylindrical surface 21a, the seat of the seal means 40. This implies that between the diameter F of the seat of said sealing means 40 and the inner diameter E of the cage 38 there must be in the game, or the diameter E must be greater than the diameter F. Evidently, the same report will have to be guaranteed also to the cage 39, an axially inner. The cage pockets 38 who will occupy the spheres are targeted towards axially inside.

Figure 4A:
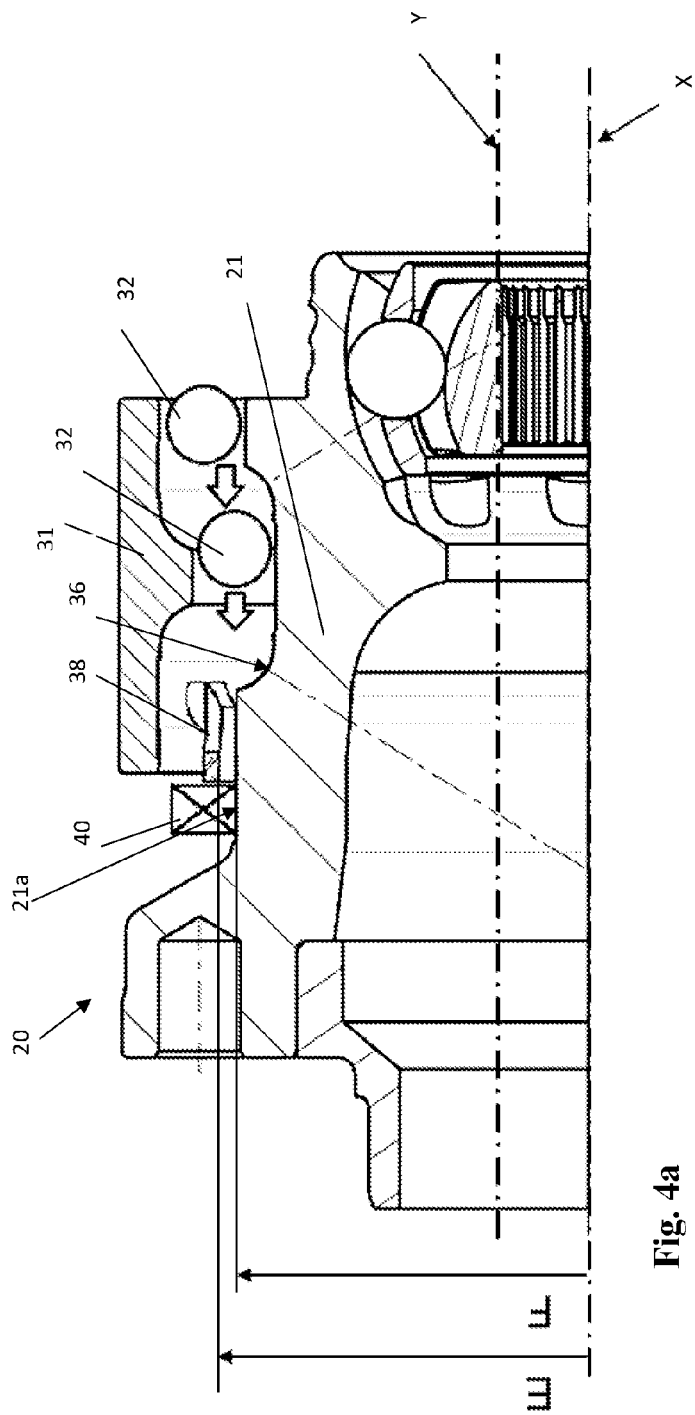
FIGS. 4*a* and 4*b* show a phase of the same assembly process, subsequent to that of FIG. 3.
Figure 4B:
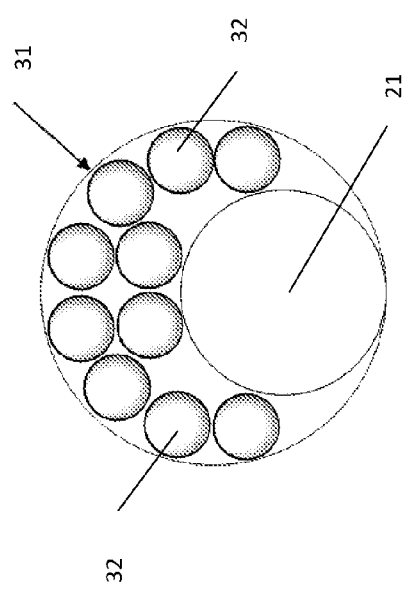

Below and with reference to FIGS. 4a and 4b, mounting the radially outer ring 31 is illustrated. The tubular portion 21 of the hub 20, or the radially inner ring, is moved radially towards the outer ring. In practice, the axis X of the hub 20, that is, the inner ring, and the ring Y axis radially outer become misaligned. The balls axially outer 32 are placed axially on the outer race 36 of the inner ring, the axially inner side. The cage 38 and the means of seal 40 prevent the balls from escaping from the end axially outer. The balls 32 will settle in an angular sector and not on the whole circumference, it is easy to see in the schematic in FIG. 4b.

Once all the balls axially external 32 have been arranged, the tubular portion 21 of the hub 20 is radially closer to the axis Y of the outer ring. In other words, the misalignment between the outer ring and the hub is reduced so as to prevent the balls axially internal 33, once inserted cramming in contact on the axially outer runway 36.

Figure 5:
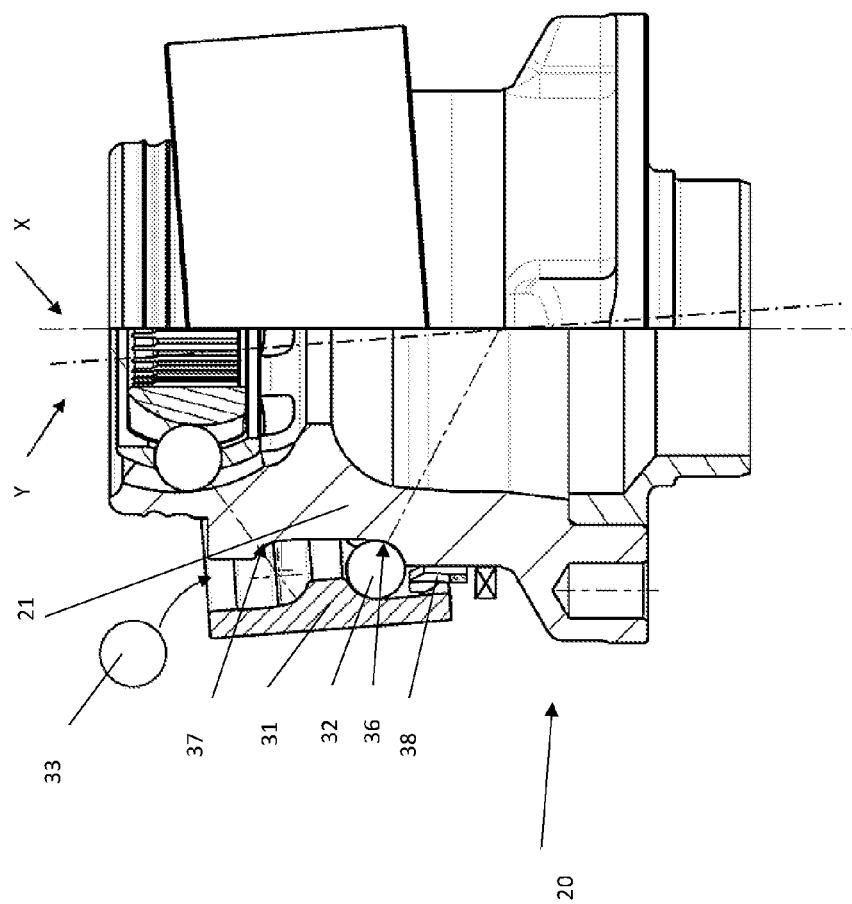
FIG. 5 shows a further stage of the same assembly process, subsequent to that of FIG. 4.

With reference to FIG. 5, the radially outer ring 31 it is inclined by a predetermined angle so that the balls axially inner 33 can be put into position. Once placed all the balls 33, it will be possible to align inner ring, or hub and outer ring and the balls 32, 33 can be distributed uniformly along the entire circumference.

The cage 38 is then inserted to snap on the balls 32, which are held in position between them equidistant from a specific tool to "comb" and the same applies to the axially inner cage 39 which will be inserted snap on the balls 33.

As a last step of the process the second sealing means 41, axially inner, is planted on its premises, from the axially inner side.

Thanks to the new assembly process, as defined, you can use these new bearing solutions whose performance is greatly improved compared to the standard solution. Since it is increased the "pitch" of the spheres, is also increased the distance between the pressure centers, with very positive effects in terms of stiffness.

The useful life of the bearing is not subject to penalties, since the number of balls used is comparable with that required by the standard solutions. On the contrary, the weight of these solutions was reduced greatly, having regard to the compactness of the realized solution, considered as a whole. In fact, while they are bearing-coupling constant speed remains substantially the same weight, to the upright of the suspension can delete a remarkable amount of material.

Finally, not negligible are also the benefits for having reduced the costs of the solution and the total number of components.

In addition to the embodiments of the invention, as described above, it is to be understood that there are many further variants. It must be understood that these embodiments of implementation are only illustrative and do not limit the invention or its applications, nor its possible configurations. On the contrary, although the description above makes it possible to man craft of the implementation of the present invention at least one of its second configuration example, it should be understood that numerous variations are conceivable of the components described, without that for this will come out from the object of invention, as defined in the appended claims, interpreted literally and/or according to their legal equivalents.

The invention claimed is:

1. An assembly method for a bearing-hub unit comprising:
   providing a rotatable hub that functions as a radially inner ring and a bell of a constant velocity joint,
   providing a bearing unit having a stationary radially outer ring, a first row of rolling bodies, axially external crowns, and a second row of rolling bodies, axially internal crowns, which are disposed between the radially outer ring and the hub, wherein the rolling bodies are provided inside corresponding cages, and seals,
   a) press-fitting a first seal, axially external, on a cylindrical surface, radially external, of the rotatable hub,
   b) mounting the axially outer cage on the cylindrical surface, which is the seat of the first seal,
   c) mounting the radially outer ring so that a longitudinal axis of symmetry of the hub becomes offset with respect to a longitudinal axis of symmetry of the radially outer ring,
   d) mounting the rolling bodies, axially external crowns, in correspondence with an axially outer raceway of the hub from the axially inner side,
   e) juxtaposing the hub to the radially outer ring, to reduce the distance between the corresponding axis of the hub and axis of the radially outer ring, and inclining of the radially outer ring by a predetermined angle,
   f) mounting the rolling bodies, axially internal crowns, in correspondence with an axially inner raceway of the hub from the axially inner side,
   g) aligning the hub to the radially outer ring, to eliminate the distance between the corresponding axis of the hub and axis of the radially outer ring,
   h) snappingly inserting the axially outer cage on the rolling bodies from the axially outer side and the axially internal cage on the rolling bodies from the axially inner side, and
   i) press-fitting a second seal, axially internal, on its own seat from the axially inner side.

2. The assembly method according to claim 1, wherein the bearing-hub unit is provided with a symmetrical internal shape, or that the radius (R) of the circumference of the centers of the rolling bodies of the axially outer crown is equal to the radius (R') of the circumference of the centers of the rolling bodies of the axially inner crown.

3. The assembly method according to claim 1, wherein the bearing-hub unit is provided with a asymmetrical internal shape, or that the radius (R) of the circumference of the centers of the rolling bodies of the axially outer crown is not equal to the radius (R') of the circumference of the centers of the rolling bodies of the axially inner crown.

4. The assembly method according to claim 1, wherein to perform step b) the dimension of the inner diameter of the cage must be greater than the dimension of the diameter of the cylindrical surface, which is the seat of the first seal.

5. The assembly method according to claim 1, wherein during step d) the cage and the first seal prevent the rolling bodies from escaping the axially outer side.

6. The assembly method according to claim 1, wherein during step h) the rolling bodies are held in a position equidistant from one another by a comb tool.

* * * * *